April 23, 1968   C. D. TODD   3,379,949
ELECTRONIC BRAKING CIRCUIT FOR ELECTRIC MOTOR
Filed April 26, 1965

Carl D. Todd,
INVENTOR.

BY Walter R. Thiel

ATTORNEY.

United States Patent Office

3,379,949
Patented Apr. 23, 1968

3,379,949
ELECTRONIC BRAKING CIRCUIT FOR ELECTRIC MOTOR
Carl D. Todd, Costa Mesa, Calif., assignor to Hughes Aircraft Company, Culver City, Calif., a corporation of Delaware
Filed Apr. 26, 1965, Ser. No. 450,862
3 Claims. (Cl. 318—380)

ABSTRACT OF THE DISCLOSURE

A braking circuit for an electric motor comprising a switching circuit of solid-state components and associated current limiting resistors coupled in parallel with the terminals of the electric motor and with the power supply for the motor. An operating switch is secured in series between the power supply and one of the motor terminals. The circuit functions by sensing the interruption, when the switch is opened, of the electric power supplied to the motor for automatically providing a short circuit between the motor terminals. The motor with its terminals shorted produces a back EMF and the current developed thereby flows through the switching circuit to develop a magnetic field of a potential sufficient to retard the rotation of the motor. The parallel circuits are so provided that, when the switch is open, the motor will be shorted even when the motor armature has come to rest.

---

The present invention relates to an automatic braking circuit for an electric motor and more particularly to an electronic circuit for rapidly stopping a D.C. permanent magnet motor by automatically shorting the electric power input terminals of the motor at the instant the power to the motor is interrupted.

With the increased use of high-speed D.C. permanent magnet motors in airborne equipment, extreme importance is placed upon the speed with which the motor is braked. Generally such motors are braked by shorting the electric power input terminals to the motor when the power is removed, causing the motor to act as a generator with a shorted armature. This produces an increase in the armature current and an instantaneous braking action through the magnetic coupling of the flux produced by this current and that of the permanent magnet of the motor.

Heretofore manual switching and electromechanical circuits have been used to actuate the braking circuit; however, these methods are slow and require considerable time, often in the order of 100 milliseconds, between the instant power is removed and the instant the braking circuit is activated.

Therefore, it is an object of the present invention to provide an improved braking circuit for an electric motor.

It is a further object of the present invention to provide an improved braking circuit for an electric motor which is automatic once electric power is removed from the motor, fast in operation, and requires no additional switching beyond the normal on-off switch for the motor.

It is a still further object of the present invention to provide an improved braking circuit for an electric motor which utilizes solid-state components to achieve rapid braking of the motor.

Briefly, the improved braking circuit of the present invention comprises a switching circuit of solid-state components and associated current limiting resistors coupled in parallel with the input terminals of a permanent magnet motor and with a power supply, and an operation switch in series with one input terminal of the motor to effectively remove the supply of electric power from the input terminals.

Figure 1:
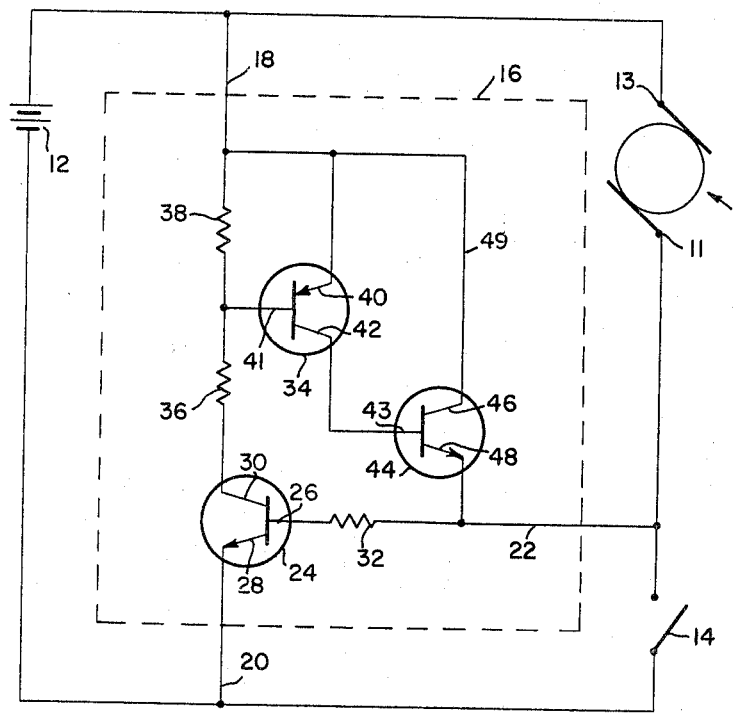
Figure 2:
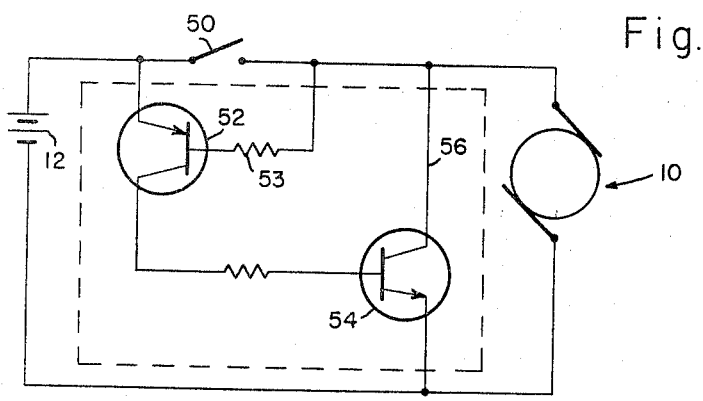

Other advantages of the invention will hereinafter become more fully apparent from the following description of the drawings which illustrate a preferred embodiment and one modification thereof and in which:

FIG. 1 is a schematic drawing of a permanent magnet motor, power supply and operating switch and the improved braking circuit coupled in parallel with the motor and switch; and FIG. 2 is a schematic drawing of a modification of the preferred embodiment of the improved braking circuit wherein one transistor and one resistor have been eliminated.

Referring now to FIG. 1, there is shown an electric motor 10 having first and second electric power input terminals 11, 13, such as a motor of the permanent magnet type, a source of electric power 12, such as a 24 volt battery, connected to the input terminals of the motor 10 and a single pole, single throw operating switch 14 connected in series with the battery 10 and motor 12. To short the input terminals 11, 13 when it is desired to stop the motor, a braking circuit 16 is connected in parallel with the motor terminals 11 and 13 by conductors 18, 22 and, to sense changes in the motor, the braking circuit 16 is coupled to the supply side of switch 14 by conductor 20.

The braking circuit 16 comprises a first active semiconductor device, 24 such as a transistor of the NPN type, a second active semiconductor 34, such as a transistor of the PNP type, and a third active semiconductor 44, such as a transistor of the NPN type. Semiconductor device 24 has an emitter electrode 28 coupled through the conductor 20 to the negative terminal of the battery 12, a collector electrode 30 coupled through a first current limiting resistor 36 and a biasing resistor 38 to the positive side of the battery 12 through the conductor 18 and a base electrode 26 coupled through a second limiting resistor 32 and the conductor 22 to the first input terminal 11. The second active semiconductor device 34 has a base electrode 41 coupled to the collector electrode 30 of the first transistor 24 through the limiting resistor 36, an emitter electrode 40 coupled to the positive side of the battery 12 and a collector electrode 42 coupled to a base electrode 43 of the third active semiconductor device 44. Device 44 has a collector electrode 46 coupled to the positive side of the battery 12 through a lead 49 and an emitter electrode 48 coupled to the first input terminal 11 of the motor 10 through the conductor 22.

The second limiting resistor 32 serves to limit the maximum base current supplied to the first transistor 24 and is of an ohmic value such that the change in the voltage across the input terminals 11, 13 of the motor 10, due to the decrease in the voltage across the armature when the switch 14 is opened, is sufficient to cause current to flow in the emitter-collector circuit of the first transistor 24, while the first limiting resistor 36 limits the maximum collector current in the first transistor 24 when it is fully saturated. This resistor 36 must be small enough to provide adequate base current for the saturation of the third transistor 44. The biasing resistor 38 is of an ohmic value sufficient to keep the second transistor nonconductive, when the motor is running (switch 14 is closed), even though a small leakage current may flow in the first transistor 24.

To more clearly understand the present invention, the following is a brief description of the operation of the braking circuit 16. When the second motor input terminal 13 is connected to the positive terminal of the battery 12, and the first terminal 11 is grounded through the switch 14, the motor runs. Also when switch 14 is closed, the base electrode 26 of the first transistor 24 is grounded through the second limiting resistor 32 and very little current will flow in the emitter-collector circuit of the first transistor 24. This further means that the second transistor 34 is "turned off" or nonconductive and likewise the third transistor 44 resulting in negligible current flowing in the emitter-collector circuit of the third transistor 44.

Now when the operating switch 14 is opened, the voltage between the input terminals 11, 13 of the motor 10 instantaneously changes. If the inductance of the motor windings are neglected, the voltage between the input terminals 11, 13 will drop by the amount of the supply current times the resistance of the armature of the motor. If the inductive effect is considered, the terminal voltage will drop even further and may even attempt to reverse polarity. This drop in voltage causes input terminal 11 to rise in potential in a positive direction and a forward bias is produced through the resistor 32 rendering the first transistor 24 conductive, thus closing a second circuit loop comprising battery 12, lead 20, transistor 24 through emitter 28 and collector 30, resistors 36 and 38 and lead 18. This closed circuit in turn, renders the second and third transistors 34, 44 conductive, closing a third circuit loop comprising battery 12, lead 20, transistor 24 through emitter 28 and base 26, resistor 32, transistor 44 through emitter 48 and base 43, transistor 34 through collector 42 and base 41, resistor 38 and lead 18. With the third transistor 44 conductive a substantial current flows in its emitter-collector circuit and through lead 49, and the source for this current is the motor which is now operating as a generator so that a short circuit loop comprises motor 10, lead 22, transistor 44 through emitter 48 and collector 46, and leads 49 and 18.

As the current in the collector of the third transistor 44 increases, the direction of current flow in the motor reverses from its original direction and thus the voltage drop across the armature resistance reverses, causing the voltage between the terminal to decrease even further driving the first transistor 24 even further into a state of conduction.

As soon as current begins to flow in the emitter-collector circuit of the third transistor, a reverse torque is applied to retard the rotation of the motor shaft. With the retarding torque applied the motor 10 begins to slow down. This reduces the generated voltage, and thus the force applied to counteract the inertia of the motor decreases until it stops. Once the third transistor 44 begins to conduct, it continues to conduct even though the motor has come to a complete stop because of the third circuit loop including transistors 34 and 44. Thus the terminals of the motor remain in a shorted state even after the motor has come to a complete stop and this shorted state will not change so long as switch 14 remains open.

One modification of the preferred embodiment is shown in FIG. 2 where one transistor and correspondingly one resistor are eliminated and the operating switch 50 is coupled into the base emitter circuit of a PNP transistor 52 rather than the base emitter circuit of the NPN transistor as in the preferred embodiment. This circuit operates the same as that of the first embodiment since the actuation depends upon the decrease in motor terminal voltage immediately upon opening of the operating switch. Here, when switch 50 is closed, motor 10 is actuated by battery 12 and transistor 52 is open because resistor 53 causes the base of transistor 52 to be more negative than its emitter. When switch 50 is opened, the emitter and base of transistor 52 are at approximately the same potential to close transistor 52, whereupon transistor 54 also closes. Closure of transistor 54 provides a short circuit loop including motor 10, lead 56, and the collector and emitter of transistor 54. As in the case of the embodiment depicted in FIG. 1, transistor 54 of FIG. 2 remains closed even when the armature of motor 10 comes to rest, thereby insuring that the short circuit loop remains closed whenever switch 50 is open.

While both a preferred embodiment of the invention and a modification of this embodiment have been illustrated, it should be appreciated by those skilled in the art that variations of the disclosed arrangement both as to its details, the polarity of the semiconductor elements, and the operation of such details may be varied without departing from the scope of this invention. Accordingly, it is intended that the foregoing disclosure and the showings made in the drawings may be considered as illustrative of this invention and not construed in a limiting sense.

What is claimed is:

1. In combination with an electric motor and a supply of electrical power coupled to the input terminals of said motor, an electronic braking circuit comprising:
   a normally non-conducting electronic circuit means coupled directly in parallel with said power supply and with the input terminals of said motor and means for detecting the interruption of the electrical power supplied to said motor and for electrically shorting said terminals,
   whereby upon effective removal of the electrical power from said motor the output current thereof flows in said circuit developing a magnetic field of an orientation sufficient to retard the rotation of said motor.

2. In combination with an electric motor and a supply of electrical power coupled to the input terminals of said motor, an electronic braking circuit comprising:
   an electronic sensing means coupled to one input terminal of said motor for detecting the interruption of the electrical power supplied to said motor; and
   an electronic conductive means coupled directly in parallel with the input terminals of said motor and with said supply and coupled to said electronic sensing means for activation thereby to provide an electrical current path,
   whereby upon effective removal of the electrical power from said motor the output current thereof flows in said electrical current path developing a magnetic field of an orientation sufficient to retard the rotation of said motor.

3. In combination with an electric motor, an electrical power supply coupled to the input terminal of said motor, and an operating switch coupled in series with said motor and said power supply, an electronic braking circuit comprising:
   a first active semiconductor device having a base electrode coupled to one of the input terminals of said motor and an emitter electrode coupled to the negative terminal of said power supply for detecting the interruption of the electrical energy supplied to said motor; and
   a shorting circuit coupled in parallel to the input terminals of said motor and coupled to said first active semiconductor device, said shorting circuit including a second and a third active semiconductor device, said second active semiconductor device having a base electrode coupled to the collector electrode of said first active semiconductor device and a collector electrode coupled to the base electrode of said third active semiconductor device and an emitter electrode coupled to the positive terminal of said power supply, said third active semiconductor device having an emitter electrode coupled to said one input terminal of said motor and a collector electrode coupled to the positive terminal of said power supply, whereby upon opening of said operating switch, the output current of said motor flows in said shorting circuit developing a magnetic field of an orientation sufficient to retard the rotation of said motor thereby causing it to stop.

References Cited

UNITED STATES PATENTS 2,965,827  12/1960  Hohne _____ 318—380

ORIS L. RADER, *Primary Examiner.*

J. J. BAKER, *Assistant Examiner.*